(12) United States Patent  
Hay

(10) Patent No.: US 6,393,840 B1  
(45) Date of Patent: May 28, 2002

(54) THERMAL ENERGY RETRIEVAL SYSTEM FOR INTERNAL COMBUSTION ENGINES

(75) Inventor: Eli Hay, Dollard des Ormeaux (CA)

(73) Assignee: TER Thermal Retrieval Systems Ltd., Montreal (CA)

( * ) Notice: Subject to any disclaimer, the term of this patent is extended or adjusted under 35 U.S.C. 154(b) by 0 days.

(21) Appl. No.: 09/515,919

(22) Filed: Mar. 1, 2000

(51) Int. Cl.⁷ .................................................. F02G 3/00
(52) U.S. Cl. .......................................... 60/618; 60/614
(58) Field of Search ........................... 60/614, 615, 618

(56) References Cited

U.S. PATENT DOCUMENTS

| | | |
|---|---|---|
| 904,961 A | 11/1908 | Hutchings |
| 2,196,980 A | 4/1940 | Campbell |
| 2,360,969 A | 10/1944 | Newcombe |
| 2,869,332 A | 1/1959 | Keller |
| 3,979,913 A | 9/1976 | Yates |
| 4,031,705 A | 6/1977 | Berg |
| 4,570,077 A | 2/1986 | Lambley |
| 4,920,750 A * | 5/1990 | Iishiki et al. ............. 60/618 X |
| 4,936,880 A * | 6/1990 | Sundberg ..................... 55/222 |
| 5,121,607 A | 6/1992 | George, Jr. |
| 5,708,306 A * | 1/1998 | Lin ........................... 60/618 X |
| 5,724,830 A * | 3/1998 | Otis et al. ...................... 62/509 |
| 5,772,850 A * | 6/1998 | Morris ........................ 202/237 |

OTHER PUBLICATIONS

Article on "Thermal Energy Retrieval (TER) System for Road Vehicles" by E. Hay & N. Hay from C496/055 @ IMechE 1995, pp. 634–641.

* cited by examiner

Primary Examiner—Hoang Nguyen  
(74) Attorney, Agent, or Firm—Swabey Ogilvy Renault; Robert Mitchell

(57) ABSTRACT

A thermal energy retrieval system in which waste heat generated by an internal combustion engine is used to evaporate an organic working fluid in an evaporator. The evaporated working fluid is passed through a turbine to generate power which could be used to supplement the work done by the internal combustion engine. A unitary control valve is disposed between a feed pump and the evaporator to automatically regulate the flow of working fluid to the evaporator in accordance with the sensed temperature of the working fluid at its exit from the evaporator. This ensures the optimization of the thermodynamic efficiency of the system, which in turn leads to the provision of a more compact system useful with a road engine as an add-on.

11 Claims, 4 Drawing Sheets

THERMAL ENERGY RETRIEVAL SYSTEM FOR INTERNAL COMBUSTION ENGINES

BACKGROUND OF THE INVENTION

1. Field of the Invention

The present invention relates to a system of energy retrieval and, more particularly, to such a system which is adapted to retrieve thermal energy from waste heat generated by an internal combustion engine, such as used in a road vehicle or stationary power generators.

2. Description of the Prior Art

Environmental concerns have led to the development of internal combustion engines which are specifically designed to reduce fuel consumption and emitted pollutants.

For instance, as disclosed in U.S. Pat. No. 3,979,913 issued on Sep. 14, 1976 to Yates, it has been proposed to direct engine coolant through a manifold area of an internal combustion engine to generate steam to drive a turbine. The output power from the turbine is used to supplement the basic power of the engine or, alternatively, to provide power to auxiliary equipment. A solenoid-operated valve is provided upstream of the engine manifold to allow or prevent engine coolant flow thereto depending on the temperature of the engine manifold.

U.S. Pat. No. 4,031,705 issued on Jun. 28, 1977 to Berg discloses an auxiliary power system in which hot engine coolant and hot engine exhaust gas are circulated through heat exchangers to vaporize a working fluid before the same enters a vapor engine for providing extra power to the main internal combustion engine. A pressure relief valve is employed in conjunction with a linear solenoid valve to control the amount of working fluid flowing through the heat exchangers as a function of the temperature of the working fluid and the hot engine coolant.

Although the systems described in the above mentioned patents are effective, their implementation has been essentially hampered by the size of the equipment needed. Accordingly, there is a need for a new thermal energy retrieval system which can be miniaturized to a size which could fit, for instance, in a truck engine environment.

SUMMARY OF THE INVENTION

It is therefore an aim of the present invention to provide a relatively compact thermal energy retrieval system adapted to convert recuperated waste heat produced by an internal combustion engine into mechanical or electrical power.

It is also an aim of the present invention to provide such a new thermal energy retrieval system which is adapted to be retrofitted to existing road vehicles.

Therefore, in accordance with the present invention, there is provided a compact thermal energy retrieval system for an internal combustion engine cooled by an engine coolant, comprising a low boiling point working fluid circulated in a closed cycle. The closed cycle includes an evaporator for heating the working fluid from a liquid state to a high pressure vapor by means of heat generated by the internal combustion engine. The cycle further includes a turbine through which the vapor is passed to develop power and a condenser to cool and condense the vapor emanating from the turbine to a condensed fluid before being re-circulated through the evaporator. Control means are provided for controlling the operation of the thermal energy retrieval system. The control means include a unitary control valve directly mounted in a main line of the thermal energy retrieval system to automatically regulate a mass flow rate of circulation of the working fluid through the evaporator in accordance with the calorific energy of the heat used to evaporate the working fluid, whereby the efficiency of the cycle can be optimized and the thermal energy retrieval system reduced in size.

In accordance with a further general aspect of the present invention, there is provided a compact evaporator for heating a working fluid from a liquid state to a high pressure vapor. The evaporator comprises a container, a heat exchanging panel spirally rolled within the container and defining an internal serpentine passage connected in flow communication with an inlet and an outlet for allowing a working fluid to flow through the serpentine passage. Inlet and outlet means are provided for allowing a heat source fluid to flow through the container on an outside surface of the heat exchanging panel to transfer heat to the working fluid via the heat exchanging panel.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
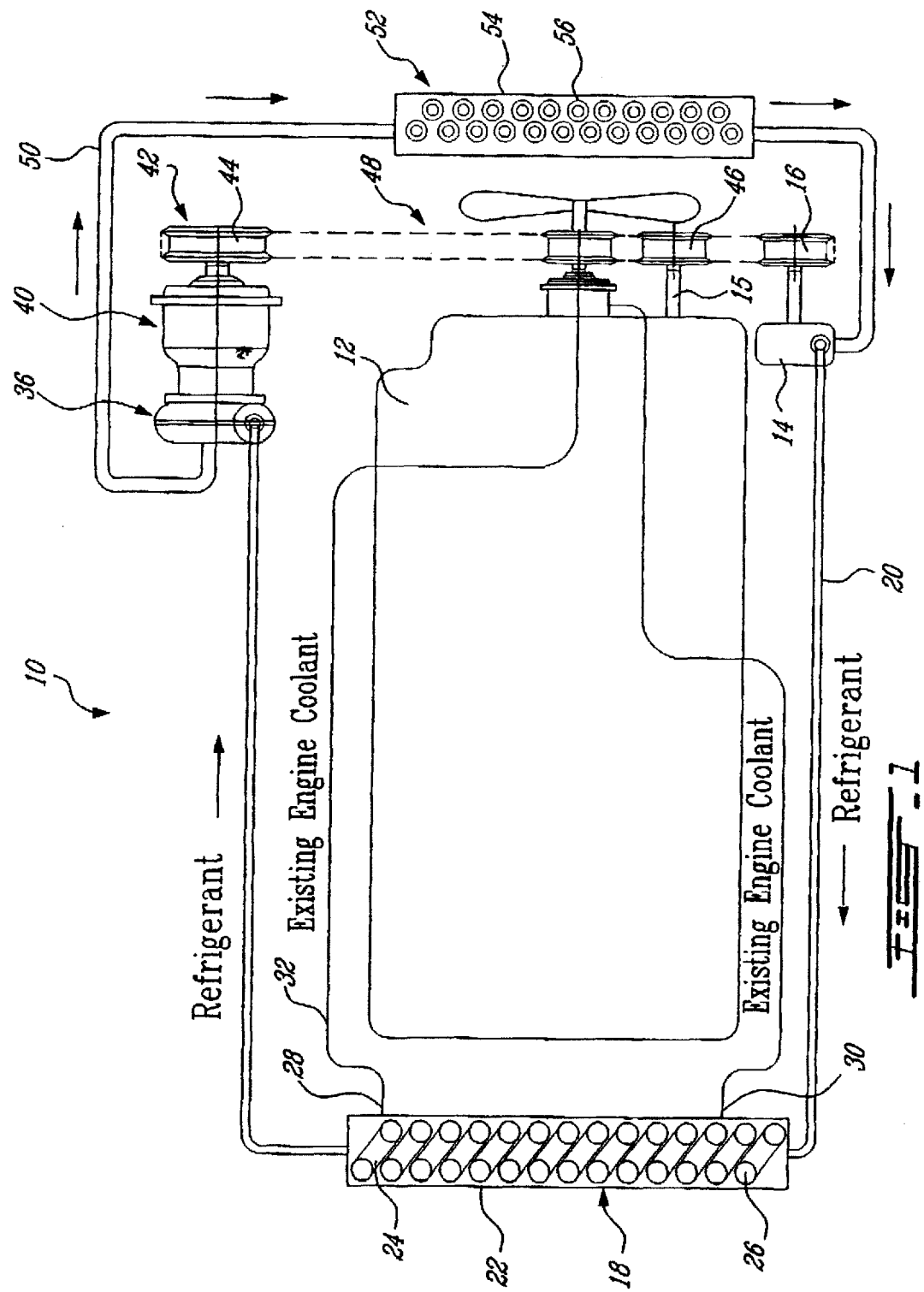
FIG. 1 is a schematic diagram illustrating a thermal energy retrieval system for an internal combustion engine in accordance with a first embodiment of the present invention.
Figure 2:
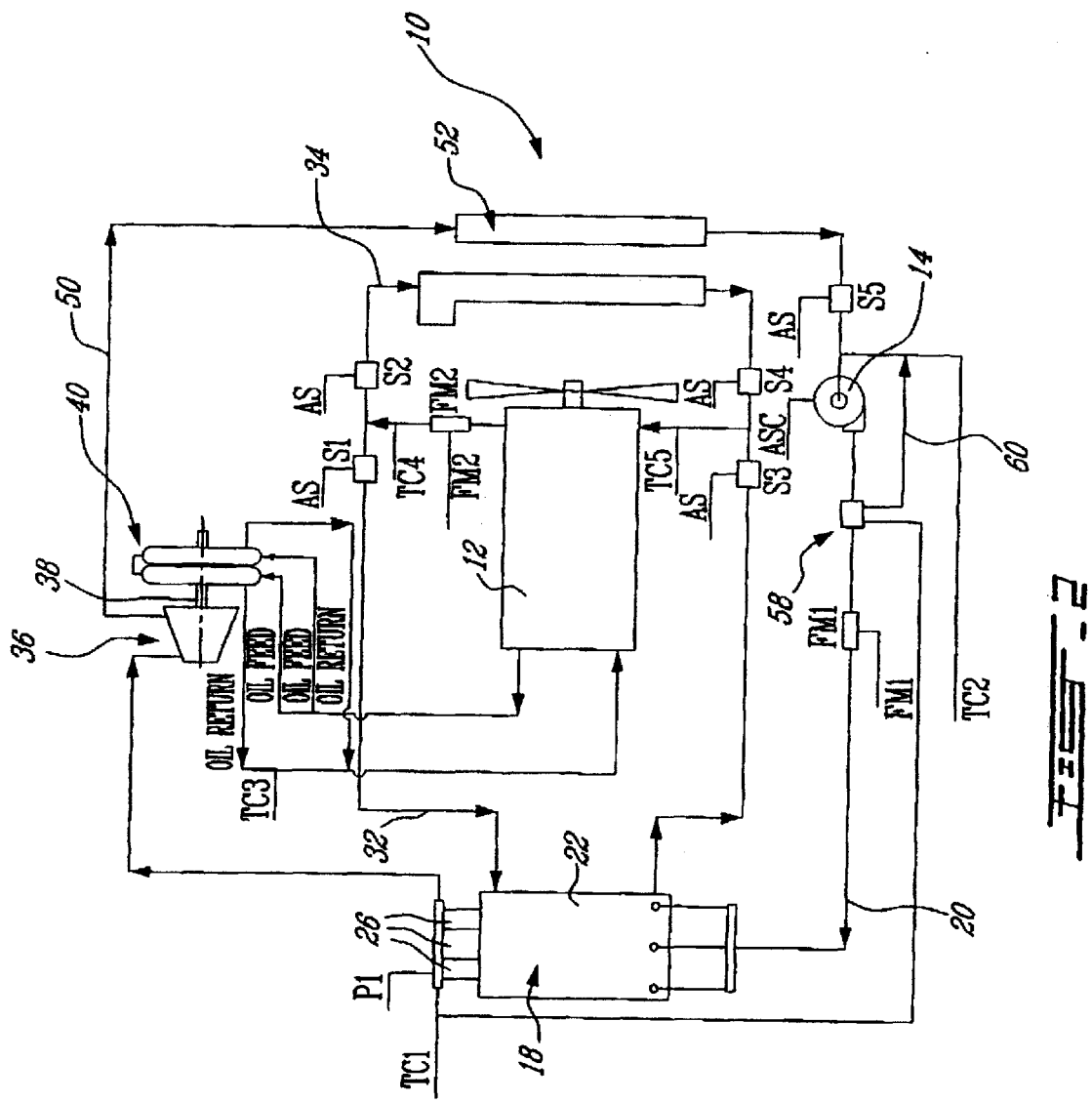
FIG. 2 is a schematic diagram of the thermal energy retrieval system of FIG. 1 illustrating the control system thereof.

Referring now to FIGS. 1 and 2, there is shown a thermal energy retrieval system 10 for an internal combustion engine 12 of the type normally used to drive a road vehicle (not shown). The thermal energy retrieval system 10 is designed to fit under the hood of the vehicle and is adapted to be mounted to the chassis thereof and on the engine 12.

The thermal energy retrieval system 10 includes a reservoir (not shown) containing an organic working fluid having a low boiling point. According to a preferred embodiment of the present invention, N-Butane is used as the working fluid. However, any other non-flammable organic fluids and CFC-free chemicals, such as TER55 (Hexafluoropropane) or TER64 (Tetrafluoroethane), could be used as well. For instance, the chemical formulae of the TER55 and the TER64 could respectively be: $CF_3$—$CH_2$—$CF_3$ and $CHClFCF_3$. A feed pump 14 is coupled in flow communication with an outlet port of the reservoir. The pump 14 is of standard construction an has a vane impeller (not shown). The pump 14 is driven by the crankshaft 15 of the internal combustion engine 12 via an electromagnetic clutch 16, thereby allowing the pump 14 to be selectively connected and disconnected from the engine 12.

The output from the pump 14 passes through an evaporator 18 via flexible tubing 20. The heat necessary to vaporize the working fluid from a liquid phase to a high pressure vapor in the evaporator 18 is provided by the waste heat generated by the engine, such as the engine coolant emanating from the engine 12. The evaporator 18 is thermally insulated and specially designed in a compact way to fit under the hood of the road vehicle, above the engine 12.

Figure 3:
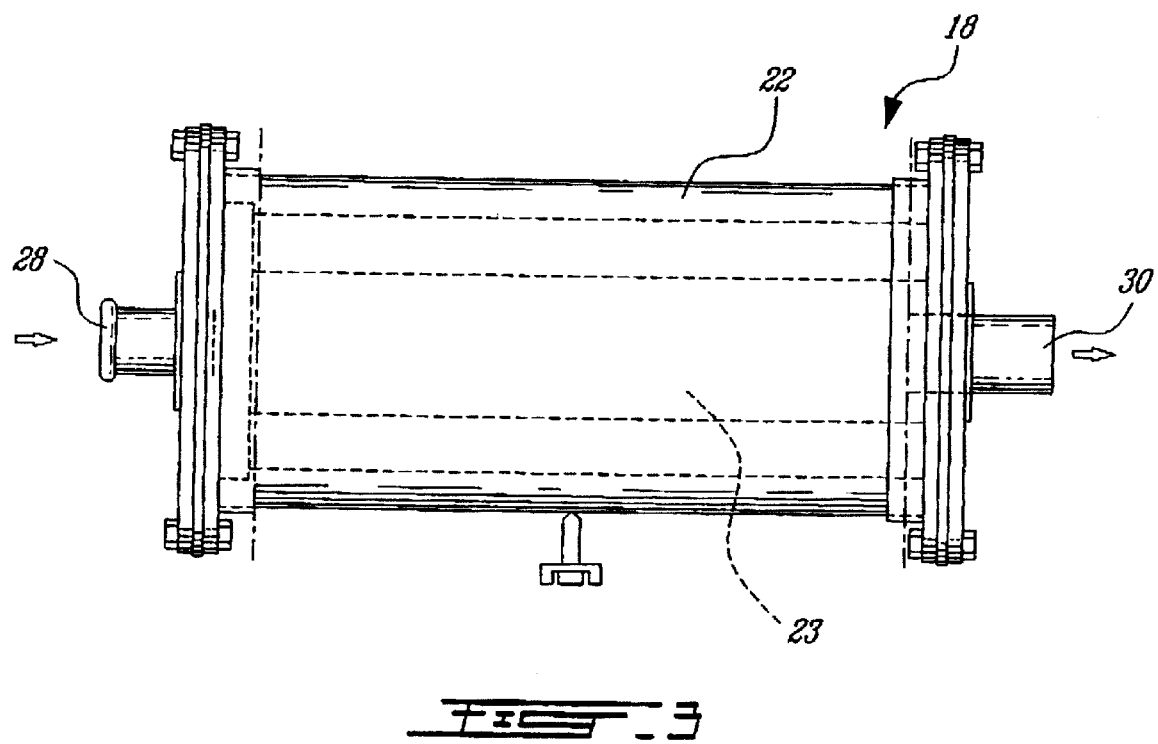
FIG. 3 is an elevational view of an evaporator forming part of the thermal energy retrieval system of FIG. 1.
Figure 4:
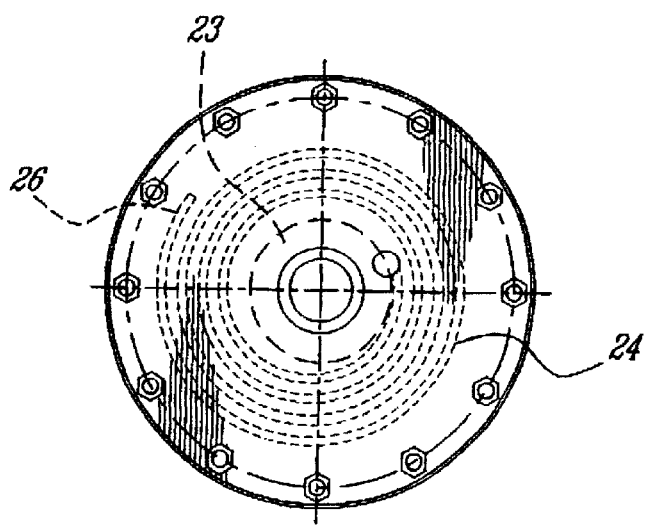
FIG. 4 is an end view of the evaporator of FIG. 3.
Figure 5:
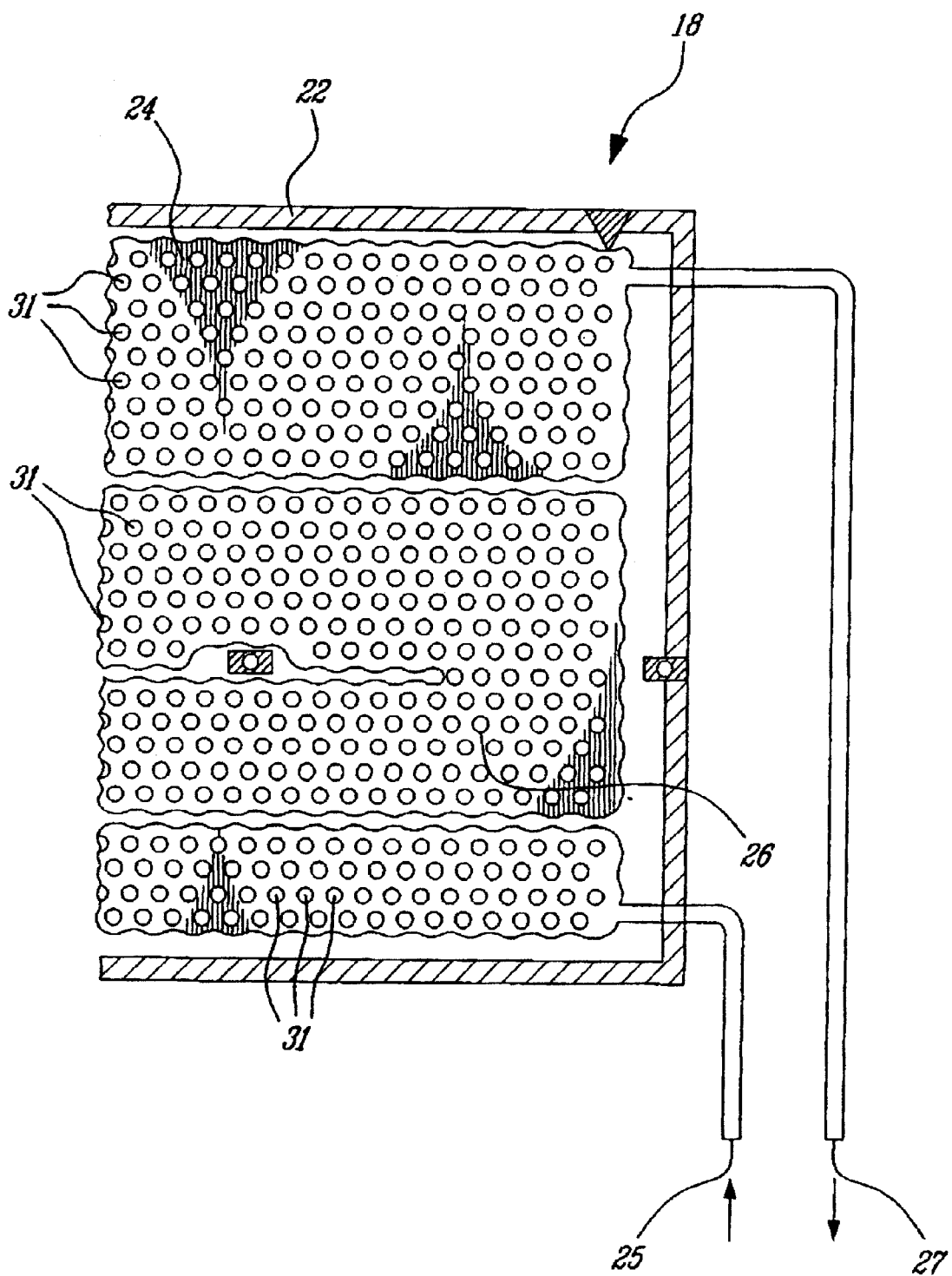
FIG. 5 is an enlarged cross-sectional view of the evaporator of FIG. 3.

More particularly, as seen in FIGS. 3 to 5, the evaporator 18 includes a cylindrical container 22 and a light roll-bond heat-exchanging panel 24 spirally wound within the cylindrical container 22 about a cylindrical core 23. The panel 24 is in fact a double walled panel defining an internal serpentine passage 26 (see FIG. 5) for the working fluid to flow through from an inlet 25 to an outlet 27. The serpentine passage 26 is preferably longitudinally oriented relative to the cylindrical container 22. As seen in FIG. 5, a plurality of uniformly distributed semi-spherical bubbles 31 extend inwardly from the front and back faces of the panel 24 within the serpentine passage 26 to act as flow turbulators in order to promote heat exchange between the working fluid and the engine coolant flowing on the outside of the panel 24.

Inlet and outlet ports 28 and 30 are defined at opposed ends of the container 22 for allowing the hot engine coolant to pass through the container 22 on the outside of the panel 24. As seen in FIG. 1, the inlet and outlet ports 28 and 30 are in fluid communication with appropriate tubing 32 connected in fluid communication with a standard cooling line 34 (see FIG. 2) through which engine coolant is normally circulated to cool the engine 12. As seen FIG. 2, first and second solenoid valves S1 and S3 are provided to selectively allow or block engine coolant flow through the evaporator 18. It is noted that the container 22 is sized so as to relatively tightly encircle the spirally wound panel 24. The container 22 is preferably made of aluminum alloys in particular #6061 or #6063. The panel 24 is also preferably made of aluminum alloys but in particular #1001 or #3003. It is contemplated to provide more than one spirally wound panel within the container 22. For instance, as illustrated in FIG. 2, three distinct working fluid passages 26 could be provided within the container 22.

The high pressure vapor is then fed to an expander/turbine unit 36 which could include a commercial turbine section of a turbo-charger to obtain expansion of the organic working fluid for driving the turbine. According to a preferred embodiment of the present invention, the expander/turbine unit 36 is, in fact, a reversedriven turbo-charger. The expander/turbine unit 36 operates at high speeds and provides an expansion pressure ratio of between 6:1 and 2:1.

The expander/turbine unit 36 includes an output shaft 38 which is connected to a reduction gear unit 40 which is adapted to reduce the output from the expander/turbine unit 36 of 80–100,000 rpm to 1,800–2,500 rpm. The reduction gear unit 40 uses an overrunning clutch (not shown) to avoid loading the internal combustion engine 12 when the thermal energy retrieval system 10 is not in use.

As seen in FIG. 1, the reduction gear unit 40 is connected to a light belt system 42 which is, in turn, connected to the crankshaft 15 of the internal combustion engine 12 to add waste-thermally-retrieved power thereto. The light belt system 42 includes a freewheel 44 connected to the output of the reduction gear unit 40 to transmit power to a pulley 46 mounted for rotation with the crankshaft 15. An endless toothed belt 48 extends over the freewheel 44 and the pulley 46 to transmit power from the freewheel 44 to the pulley 46 and, thus, the crankshaft 15.

The reduction gear unit 40 and the light belt system 42 can be combined into a single unit which produces a speed reduction factor of between 40:1 and 70:1.

The spent working fluid emanating from the expander/turbine unit 36 is then directed by means of a flexible hose 50 or the like into a condenser 52, where it is cooled and condensed from a vapor state to a liquid state by a cold fluid, such as ambient air intake. Thereafter, the condensed fluid is pumped back into the evaporator 18 to repeat the cycle.

The condenser 52 includes an aluminum frame 54 in which a serpentine tube 56 sits for receiving the working fluid therethrough. The tube 56 is preferably made of aluminum alloys, such as #1001. Fins (not shown) are spirally disposed around the tube 56 in order to increase the heat exchange surface and improve the efficiency of heat transfer. The fins are preferably made of aluminum alloy wire loops.

A control system is provided to ensure optimized and safe operation of the thermal energy retrieval system 10. More particularly, the control system has a threefold function:

i) To isolate the thermal energy retrieval system 10 when the calculated output is below the required energy to operate the system 10;
ii) To allow efficient operation at part load; and
iii) To protect the various units from overpressure, over-temperature and over-speed.

The control system includes a microprocessor (not shown) and a control valve 58 adapted to control the flow of the working fluid on the liquid side of the cycle. The control valve 58 is disposed between the feed pump 14 and the evaporator 18. By using the control valve 58 on the liquid side of the cycle rather than on the vapor side thereof, a more compact and cheaper control valve can be used.

The operation of the system 10 at part load is effected by controlling the mass flow rate of circulation of the working fluid. This is done automatically by the control valve 58.

When the power available in the engine coolant reduces, the temperature of the working fluid at the exit from the evaporator 18 will drop. As seen in FIG. 2, a temperature sensor TC1 senses the change and alters the opening of the control valve 58 such that less working fluid flows to the evaporator 18, the rest being discharged through an overflow line 60 back to the inlet side of feed pump 14. Accordingly, the control valve 58 have two output ports (not shown), one being connected in flow communication with the evaporator 18 and the other with the a overflow line 60.

The opposite occurs when there is excess energy in the engine coolant. The temperature of the working fluid at exit from the evaporator 18 rises and the control valve opens so as to allow more working fluid to flow to the evaporator 18.

By so optimizing the efficiency of the cycle, it becomes possible to keep the dimensions of the evaporator as small as possible. It is noted that the choice of the working fluid has also a significant influence on the thermodynamic efficiency of the cycle and, thus, on the physical size of the elements forming the thermal energy retrieval system 10.

As mentioned hereinbefore, the control system through its microprocessor is adapted to activate the thermal energy retrieval system 10 only when sensed engine operating conditions are such that a positive power output can be obtained from the system 10. The thermal energy retrieval system 10 can be readily deactivated or isolated by switching off the feed pump 14. This is done by switching off the electromagnetic clutch 16 between the pulley 46 and the pump 14 itself.

As seen in FIG. 2, the control system further includes a working fluid flow rate meter FM1 mounted between the control valve 58 and the evaporator 18 to provide an output signal as a function of the flow rate of the working fluid directed to the evaporator 18. The output signals from the flow rate meter FM1 and the temperature sensor TC1 are input into the microprocessor which is pre-programmed to calculate the power output of the thermal energy retrieval system 10 under these conditions. If the calculated power output is less than the consumption level of the feed pump 14, plus an allowance for frictional losses, then the electromagnetic clutch 16 is switched off, and the system 10 ceases to operate. Thereafter, the normally open solenoid valves S3 and S1 are switched to close, thus returning the engine to normal radiator cooling and preventing engine coolant flow to the evaporator 18. It is important for the switching sequence to occur in the order indicated above to avoid water hammer occurring. The microprocessor must be programmed accordingly.

The reverse sequence occurs when the thermal energy retrieval system 10 is switched on again. The parameters used by the microprocessor to determine whether the thermal energy retrieval system 10 should be activated or not are obtained by a second flow meter FM2 mounted in the engine cooling line 34 at an exit of the engine 12 and by a pair of temperature sensors TC4 and TC5 disposed in the cooling line 34 to sense the temperature of the engine coolant downstream and upstream of the engine 12. The temperature sensor TC4 and TC5 could, for instance, consist of conventional thermocouples. The thermal energy retrieval system 10 is re-activated when the engine coolant flow rate, indicated by the second flow meter FM2, and the difference between the temperatures sensed by the sensors TC4–TC5 indicate that a positive power input, plus frictional losses, can be expected. The calculation is done within the programmed microprocessor.

For safety purposes, the thermal energy retrieval system 10 must not be subjected to overpressure. The most sensitive part is the evaporator 18 which is effectively a pressure vessel. As seen in FIG. 2, the pressure in the evaporator 18 is sensed by a piezoelectric gauge P1 and the reading is conveyed to the microprocessor. If the pressure rises above a specified threshold, the system 10 is deactivated via the clutch 16. When N-butane is used as the working fluid, it is not possible to have a normal pressure relief valve, since N-butane cannot be vented to atmosphere. A lower threshold is also specified within the microprocessor below which the pressure will need to drop before the system 10 is allowed to switch on again.

Overheating can occur in the control valve and the overflow line 60 in cases when the majority of the flow is returned to the inlet of the feed pump 14 via the overflow line 60. Accordingly, a thermocouple TC2 has been provided to sense the temperature of the working fluid entering in the pump 14 and send an output signal to the microprocessor to deactivate the system 10 when a specified threshold is exceeded.

Overheating can also occur in the expander/turbine unit 36 and the gear reducer unit 40. As seen in FIG. 2, the expander/turbine unit 36 and the gear reducer unit 40 are cooled by the engine oil. To avoid overheating in the expander/turbine unit 36 and the gear unit 40, a sensor, such as a thermocouple TC3 is provided to sense the temperature of the return oil and send an output signal to the microprocessor in order to deactivated the system 10 when a specified threshold is exceeded.

In each case, the thermal energy retrieval system 10 is allowed to switch on again when the temperatures sensed by TC2 and TC3 falls below a specified lower threshold.

There is, additionally, the danger that, if a belt transmission, such as belt 48 (see FIG. 1) breaks while the expander/turbine unit 36 is driving, then the expander/turbine unit 36 will over-speed and damage itself or the gear unit 40. Hence rider pulleys (not shown), positioned on each transmission belt; are provided to operate micro-switches, such as those designated by MS1 and MS2 in FIG. 2. In the event that a belt break, the associated rider pulley will trigger the associated micro-switch, thereby sending a signal to the microprocessor to shut down the system 10.

The design specifications for the microprocessor are as detailed in the above paragraphs. Additionally, warning lights and malfunction lights are provided for each function, and displayed on an instrument panel.

It is also contemplated to circulate the engine exhaust gas through the evaporator 18 in order to evaporate the working fluid.

What is claimed is:

1. A compact thermal energy retrieval system for an internal combustion engine cooled by an engine coolant, comprising a low boiling point working fluid circulated in a closed cycle, said closed cycle including an evaporator for heating said working fluid from a liquid state to a high pressure vapor by means of heat generated by the internal combustion engine, a turbine through which said vapor is passed to develop power, a condenser to cool and condense said vapor emanating from said turbine to a condensed fluid before being re-circulated through said evaporator, and control means for controlling the operation of said thermal energy retrieval system, said control means including a control valve mounted in a line of said thermal energy retrieval system to automatically regulate a mass flow rate of circulation of said working fluid through said evaporator in accordance with the calorific energy of the heat used to evaporate said working fluid, whereby the efficiency of said cycle can be optimized and said thermal energy retrieval system reduced in size, and wherein said control means further includes a pair of valves for selectively allowing and blocking engine coolant flow through said evaporator, said valves being operatively connected to said control means for blocking engine coolant flow to said evaporator when said pump is shut down.

2. A compact thermal energy retrieval system as defined in claim 1, wherein said evaporator has inlet and outlet ports for allowing waste heat fluids emanating from the internal combustion engine to be circulated through said evaporator.

3. A compact thermal energy retrieval system as defined in claim 2, wherein said working fluid is an organic fluid.

4. A compact thermal energy retrieval system as defined in claim 3, wherein said organic fluid is selected from a group consisting of: N-Butane, TER55 and TER64.

5. A compact thermal energy retrieval system as defined in claim 1, wherein said control valve includes first and second outlets, said first outlet being in flow communication with said evaporator, whereas said second outlet is in flow communication with an overflow line for returning excess working fluid flow upstream of said control valve so that only a desired amount of working fluid flows to the evaporator during engine operation.

6. A compact thermal energy retrieval system as defined in claim 5, wherein said control valve is located on a liquid side of said closed cycle between a feed pump and said evaporator.

7. A compact thermal energy retrieval system as defined in claim 1, wherein said feed pump is selectively connectable and disconnectable with and from a driving source in order to allow said thermal energy retrieval system to automatically cease operation when a negative power output is computed by said control means.

8. A compact thermal energy retrieval system as defined in claim 7, wherein said control means further includes a first flow rate meter for providing a first output signal as a function of the flow rate of the working fluid passing through said evaporator, and a first temperature sensor for providing a second output signal as a function of the temperature of said working fluid at one of an entry and an exit of said evaporator, and wherein disconnection of said pump from said driving source is governed by a function of said first and second output signals.

9. A compact thermal energy retrieval system as defined in claim 8, wherein said control means further includes a second flow rate meter for providing a third output signal as a function of the flow rate of the engine coolant, and second and third temperature sensors for providing fourth and fifth output signals as functions of the temperature of the engine coolant at an entry and an exit of said internal combustion engine, and wherein re-connection of said pump with said driving source is governed by a function of said third, fourth and fifth output signals.

10. A compact thermal energy retrieval system as defined in claim 1, wherein said control means further includes a sensor for sensing the temperate of said working fluid at an exit of said evaporator, said control valve being operatively connected to said sensor so that when the temperature of the working fluid drops at the exit of said evaporator, said control valve automatically closes to reduce the amount of working fluid flowing to said evaporator, and when the temperature of the working fluid rises at said exit of said evaporator, said control valve automatically opens to allow more working fluid to flow to said evaporator.

11. A compact thermals energy retrieval system for an internal combustion engine cooled by an engine coolant, comprising a low boiling point working fluid circulated in a closed cycle, said closed cycle including an evaporator for heating said working fluid from a liquid state to a high pressure vapor by means of heat generated by the internal combustion engine, a turbine through which said vapor is passed to develop power, a condenser to cool and condense said vapor emanating from said turbine to a condensed fluid before being re-circulated through said evaporator, and control means for controlling the operation of said thermal energy retrieval system, said control means including a control valve mounted in a line of said thermal energy retrieval system to automatically regulate a mass flow rate of circulation of said working fluid through said evaporator in accordance with the calorific energy of the heat used to evaporate said working fluid, whereby the efficiency of said cycle can be optimized and said thermal energy retrieval system reduced in size, and wherein said feed pump is selectively connectable and disconnectable with and from a driving source in order to allow said thermal energy retrieval system to automatically cease operation when a negative power output is computed by said control means, and wherein said control means further includes a first flow rate meter for providing a first output signal as a function of the flow rate of the working fluid passing through said evaporator, and a first temperature sensor for providing a second output signal as a function of the temperature of said working fluid at one of an entry and an exit of said evaporator, and wherein disconnection of said pump from said driving source is governed by a function of said first and second output signals.

* * * * *